United States Patent
Iwanaga

[11] Patent Number: 6,108,294
[45] Date of Patent: Aug. 22, 2000

[54] DISK DRIVING DEVICE WITH SMALL CENTERING FORCE VARIATION

[75] Inventor: Atsushi Iwanaga, Miyagi-ken, Japan

[73] Assignee: Alps Electric Co., Ltd., Tokyo, Japan

[21] Appl. No.: 08/941,969

[22] Filed: Oct. 1, 1997

[30] Foreign Application Priority Data

Oct. 2, 1996 [JP] Japan .................................. 8-281486

[51] Int. Cl.[7] .................................................. G11B 17/03
[52] U.S. Cl. ................................................................ 369/270
[58] Field of Search ...................................... 369/270, 271; 360/98.08, 99.12

[56] References Cited

U.S. PATENT DOCUMENTS

| | | | |
|---|---|---|---|
| 4,562,570 | 12/1985 | Denton | 369/270 |
| 4,649,531 | 3/1987 | Horowitz et al. | 369/270 |
| 4,730,300 | 3/1988 | Kamoshita et al. | 369/270 |
| 5,006,945 | 4/1991 | Furusawa | 360/99.12 |
| 5,050,159 | 9/1991 | Kenmotsu | 369/270 |
| 5,555,233 | 9/1996 | Yano et al. | 369/270 |
| 5,761,186 | 1/1996 | Mushika et al. | 369/271 |
| 5,799,006 | 10/1996 | Mukawa | 369/270 |

FOREIGN PATENT DOCUMENTS

| | | |
|---|---|---|
| 0 553 034 A2 | 5/1991 | European Pat. Off. . |
| 0 428 382 A2 | 7/1993 | European Pat. Off. . |

*Primary Examiner*—Brian E. Miller
*Assistant Examiner*—Kenneth W Fields
*Attorney, Agent, or Firm*—Brinks Hofer Gilson & Lione

[57] ABSTRACT

A disk driving device including a centering member mounted to an inner portion of a cylindrical portion of a turntable. The centering member includes a linking portion serving as fulcra and a centering portion separated from the linking portion. The centering portion is resiliently biased with an outward force that acts parallel to a flange providing a disk-mounting surface of the turntable in order to center a disk.

4 Claims, 7 Drawing Sheets

FIG. 13
PRIOR ART

DISK DRIVING DEVICE WITH SMALL CENTERING FORCE VARIATION

BACKGROUND OF THE INVENTION

1. Field of the Invention

The present invention relates to a disk driving device for driving a disk such as a compact disk or a CD-ROM.

2. Description of the Related Art

A description will be given of a conventional disk driving device of the above type, with reference to FIGS. 10 to 13.

In the conventional disk driving device in the figures, a spindle motor (not shown) causes rotation of a rotor yoke 11, which causes rotation of a turntable 13 having mounted thereto a rotary shaft 12 by press-fitting or the like. The turntable 13 is made of brass that is subjected to turning or the like. A cylindrical portion 13a is formed around the center portion of the turntable 13, with the aforementioned rotary shaft 12 press-fitted and secured to the center of the cylindrical portion 13a. A disk-shaped flange 13b is formed at the outer peripheral side of the cylindrical portion 13a, and has a flat surface having affixed thereto with an adhesive tape an anti-slipping sheet 14 serving as the disk-mounting surface.

The bottom surface of the turntable 13 is affixed to the rotor yoke 11. At the upper surface of the cylindrical portion 13a of the turntable 13 is formed a circular recess 13c having affixed therein an annular attraction magnet 15. A centering spring 16 for centering a disk D is supported in the recess 13c with the aforementioned attraction magnet 15.

Figure 10:
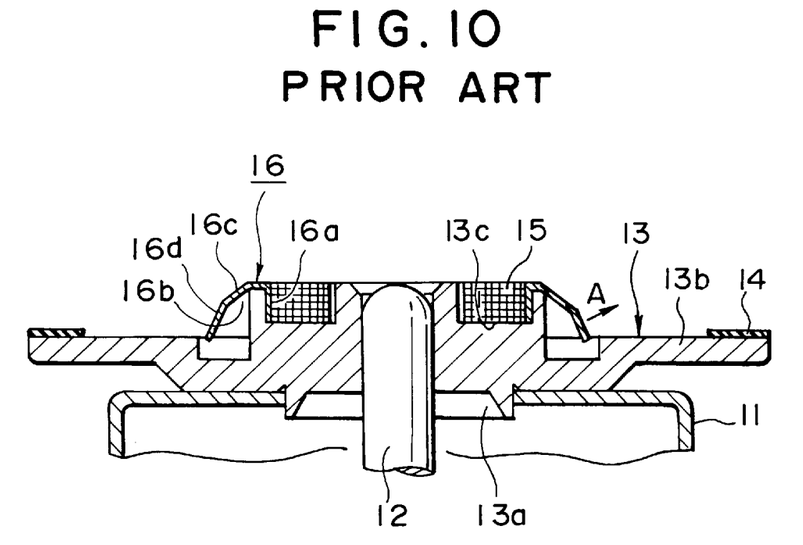
FIG. 10 is a sectional view of a conventional disk driving device, in which a disk is not loaded therein.
Figure 12:
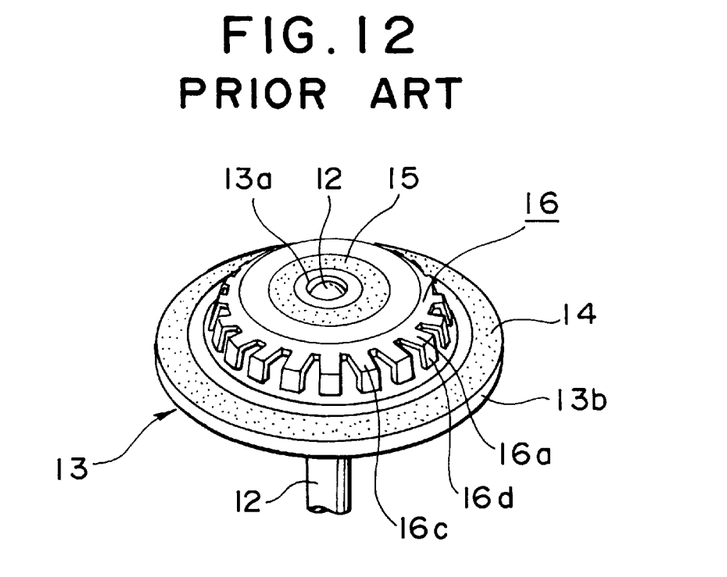
FIG. 12 is a schematic view showing the conventional centering spring mounted to the turntable.

As shown in FIGS. 10 and 12, the centering spring 16 is circular in appearance and is made of such material as synthetic resin. The centering spring 16 includes at the center side thereof a support portion 16a formed by bending a portion of the spring 16 downward, first tapering portions 16c formed at an end of its corresponding fulcrum 16b disposed at the outer peripheral side of its associated support portion 16a, and second tapering portions 16d formed continuously with their corresponding first tapering portions 16c. The first tapering portions 16c comprise a plurality of centering portions for centering a disk D. The second tapering portions 16c are sloped with a greater angle than the first tapering portions, with their free ends formed into a plurality of petal-like tongue pieces. Since the first and second tapering portions 16c and 16d are formed into a cantilever arrangement with the fulcra 16b as centers, the second tapering portions 16d used for centering the disk D are resiliently biased outwardly and obliquely upward in the direction of arrow A of FIG. 10.

Figure 11:
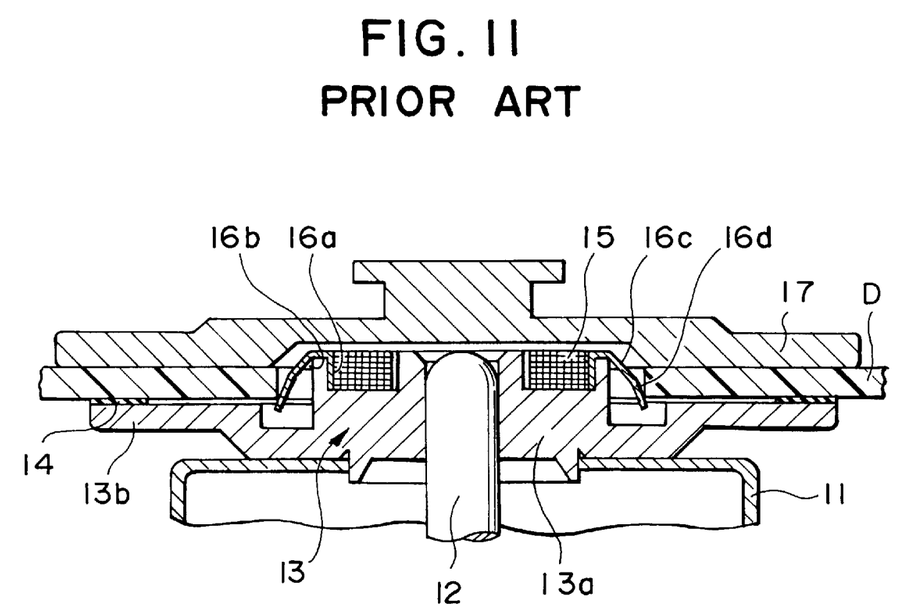
FIG. 11 is a sectional view of the conventional disk driving device, in which a disk is loaded therein.

A clamper 17 is disposed above the turntable 13 and the centering spring 16 in order to chuck the disk D placed at the flange 13b of the turntable 13, as shown in FIG. 11.

A description will now be given of the operation of the conventional disk driving device. As shown in FIG. 11, when a disk D is loaded into the conventional disk driving device, the peripheral edge of a center hole D1 of the disk D contacts the first and second tapering portions 16c and 16d of the center spring 16 having resiliency. While the second tapering portions 16d being resiliently biased in the direction of arrow A of FIG. 10 as mentioned above moves circularly on the fulcra 16b as centers, the disk D slides down along the first and second tapering portions 16c and 16d, as it presses the second tapering portions towards the cylindrical portion 13a of the turntable 13. Then, the disk D is centered at the first and second tapering portions 16c and 16d, and placed on the anti-slipping sheet 14 on the turntable 13.

At the same time that the disk D is centered, the clamper 17 which has been waiting above the turntable starts to move down. Then, the clamper 17 presses the surface of the disk D due to the attraction force of the attraction magnet 15, whereby the disk D is clamped by the turntable 13 and the clamper 17, thus completing the centering and chucking of the disk D.

Thereafter, when an electrical power with a predetermined phase is supplied to a drive coil of a spindle motor (not shown), the rotor yoke 11 rotates, causing integral rotation of the turntable 13 and the rotary shaft 12. Thus, since the disk D can rotate, while it is clamped by the clamper 17 and the turntable 13, information can be read out from or written onto the disk D.

In the conventional disk driving device, however, the first and second tapering portions 16c and 16d of the centering spring 16 are in a cantilever arrangement with the fulcra 16b as centers, so that the second tapering portions 16d used for centering the disk D are resiliently biased outward and obliquely upward in the direction of arrow A of FIG. 10. This produces a force that constantly tries to raise the disk D upward, which may cause the anti-slipping sheet 14 providing a disk-mounting surface of the turntable 13 to be raised upward, or the disk D to be loaded in an oblique state, when the disk D is loaded onto the centering spring 16. When the clamper 17 moves down, while the disk D remains raised from the disk-mounting surface of the turntable 16, or is loaded in an oblique state, the clamper 17 may scratch or deform the surface of the disk D, thereby preventing information to be properly read out from or written onto the disk D.

In the conventional centering spring 16, the distance from each fulcrum 16b to its corresponding second tapering portion 16d is short, thus increasing the load exerted on each fulcrum. When a load is repeatedly exerted onto each fulcrum 16b as a result of loading and unloading the disk, fatigue of the fulcrum 16b results, causing the disk D to break more often.

In addition, since the distance from the fulcrum 16b to the second tapering portion 16d is short, in order to produce a centering force, it is necessary that the first and second tapering portions 16c and 16d serving as arms have a large spring constant. Therefore, large variations result in the disk centering forces produced at the tapering portions due to dimensional variations, thereby reducing the disk centering precision, causing read errors to occur.

Further, since the first and second tapering portions 16c and 16d of the centering spring 16 comprise a plurality of petal-like tongue pieces, the area of contact between the second tapering portions 16d and the peripheral edge of the center hole D1 of the disk D becomes large, producing frictional resistance. Thus, when the disk D is loaded onto the centering spring 16, the disk D cannot slide smoothly, resulting in the problem that the disk D cannot be smoothly loaded onto the disk-mounting surface of the turntable 13.

Figure 13:
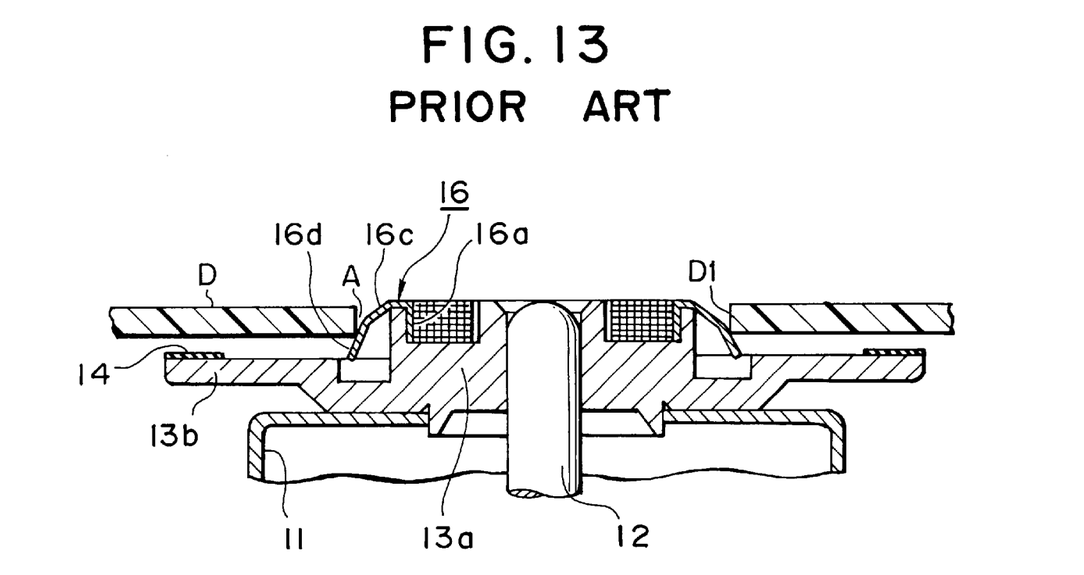
FIG. 13 is a sectional view illustrating the inconveniences of the conventional centering spring.

Still further, since the front ends of the first and second tapering portions 16c and 16d of the centering spring 16 are free ends, it has been difficult to form the ends of the plurality of second tapering portions 16d along the same circumference due to manufacturing variations. Therefore, as shown in FIG. 13, when the disk D is loaded onto the centering spring 16, there were disk driving devices in which some of the plurality of second tapering portions 16d did not contact and thus were separated from the peripheral edge of the center hole D1 of the disk D. This has caused the disk D to be decentered or obliquely placed, or has prevented smooth loading of the disk D onto the disk-mounting surface of the turntable 13.

SUMMARY OF THE INVENTION

According to a first form of the present invention, there is provided a disk driving device comprising: a rotor yoke; a turntable mounted to the rotor yoke and including a disk-mounting surface; and a centering member, mounted either to the turntable or the rotor yoke, for centering a disk, the centering member including a supporting portion mounted to either the turntable or the rotor yoke, and a centering portion extending from the supporting portion in a direction of the disk-mounting surface of the turntable, the centering member being resiliently biased horizontally and outwardly in the direction of the disk-mounting surface of the turntable to center the disk.

According to a second form of the present invention, there is provided a disk driving device, wherein the centering portion is formed by a strip-like, plate-shaped member, and wherein the centering portion is disposed such that a lengthwise extension of the centering portion is horizontal to the direction of the disk-mounting surface of the turntable, and a widthwise extension of the plate-shaped member is perpendicular to the direction of the disk-mounting surface of the turntable.

According to a third form of the present invention, there is provided a disk driving device, wherein the centering member further comprises a base mounted to the rotor yoke in order to integrally form a plurality of the centering portions with the base. According to a fourth form of the present invention, there is provided a disk driving device, wherein the centering portion comprises a strip-like protruding portion extending in a direction perpendicular to the direction of the disk-mounting surface of the turntable.

According to a fifth form of the present invention, there is provided a disk driving device, further comprising a positioning portion for positioning a plurality of the centering portions along a same circumference on either the turntable or the rotor yoke by bringing the plurality of the centering portions into contact with locations along the same circumference.

According to a sixth form of the present invention, there is provided a disk driving device, further comprising a cylindrical portion for guiding a disk to the turntable, the cylindrical portion having formed therein centering windows at a plurality of locations, the centering windows having positioned therein the centering portions such that the protruding portions of the centering portions protrude beyond the outer peripheral surface of the cylindrical portion.

DESCRIPTION OF PREFERRED EMBODIMENTS

A description will now be given of preferred embodiments of a disk driving device of the present invention, with reference to FIGS. 1 to 8. The disk driving device in FIG. 1 comprises a rotor yoke 1 composed of an iron plate or the like that is rotationally driven using a drive coil of a spindle motor (not shown). The rotor yoke 1 includes a boss hole 1*a* and a plurality of protrusions 1*b*. The boss hole 1*a* is formed in the center of the yoke 1 by burring or the like so as to extend downward. The plurality of protrusions 1*b* are formed at the upper surface of the yoke 1 towards the outer peripheral side so as to protrude upwards. A rotary shaft 2 is press-fitted and affixed to the boss hole 1*a*.

Figure 1:
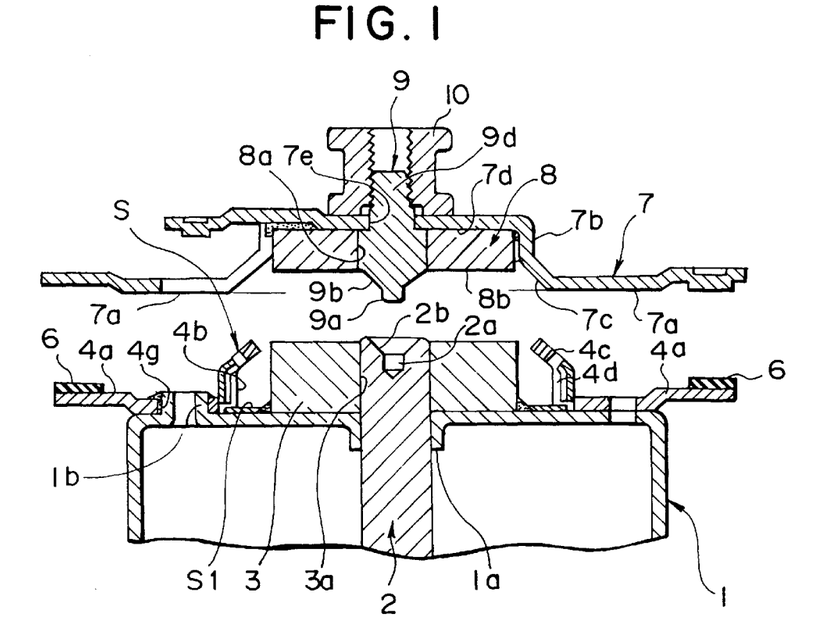
FIG. 1 is a sectional view of an embodiment of a disk driving device in accordance with the present invention, in which a disk is not loaded.

The rotary shaft 2 has one end thereof extending upward from the upper surface of the rotor yoke 1. A cylindrical alignment hole 2*a* is formed in the rotational center of this end, and a chamfered portion 2*b* is formed therearound.

Figure 3:
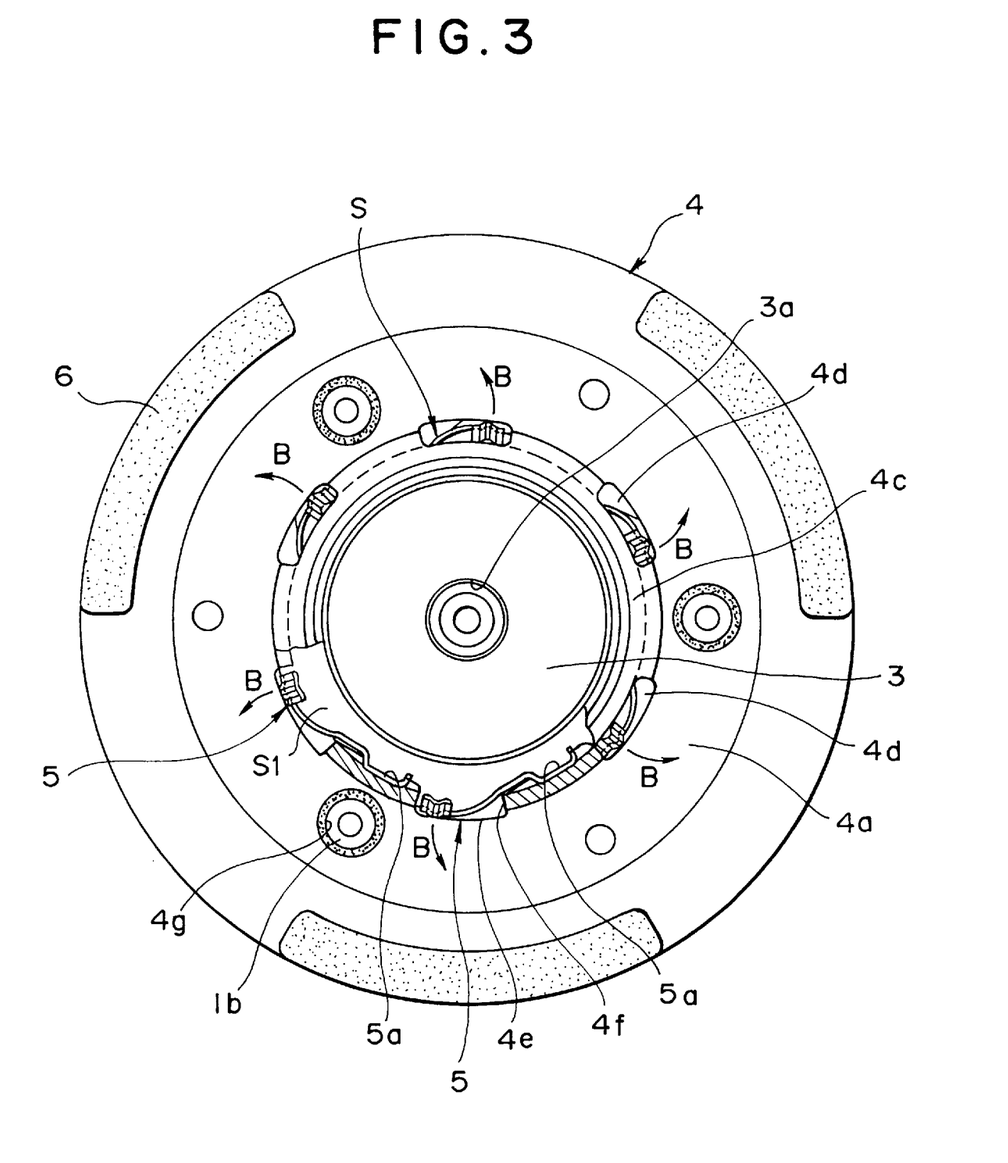
FIG. 3 is a top view of the turntable and the centering member of the disk driving device of FIG. 1.

At the upper center portion of the rotor yoke 1 is disposed a disk-shaped first attraction magnet 3 made of sintered ferrite material and having a center hole 3*a* extending through the center of the magnet 3 as shown in FIG. 3. The center hole 3*a* has fitted and affixed thereto one end of the rotary shaft 2 extending upward from the upper surface of the rotor yoke 1. The affixing is done using an adhesive or the like. In addition to being affixed to the rotary shaft 2, the first attraction magnet 3 is affixed to the rotor yoke 1 using an adhesive or the like, with its upper surface magnetized such that it becomes, for example, unipolar and a north pole.

At the upper surface of the rotor yoke is disposed a turntable 4 composed of, for example, an iron plate so as to surround the first attraction magnet 3. The turntable 4 includes a flange 4*a*, a cylindrical portion 4*b*, and a sloped wall 4*c* disposed upwardly of the cylindrical portion 4*b*. The flange 4*a* provides a mounting surface of a disk D whose outer periphery is disk shaped. The cylindrical portion 4*b* protrudes from the center portion of the flange 4*a* so as to surround the first attraction magnet 3. The sloped wall 4*c* is tapered, is sloped inwardly with respect to the cylindrical portion 4*b*, and has an end whose upper portion is a cylindrically-shaped free portion.

Centering windows 4*d* are formed at a plurality of locations at the outer periphery of the cylindrical portion 4*b*. The top portion of each window 4*d* extends along the sloped wall 4*c*. The bottom portion of each window 4*d* extends along its corresponding wall 4*e* provided at the flange 4*a*. The side portions thereof extend along its corresponding side walls 4*f*.

Positioning holes 4g are formed at a plurality of locations at equal intervals so as to be disposed at the inner peripheral side of the flange 4a. The protrusions 1b are fitted into the positioning holes 4g to position the rotor yoke 1 and the turntable 4 in order to affix them together with an adhesive or the like.

Figure 4:
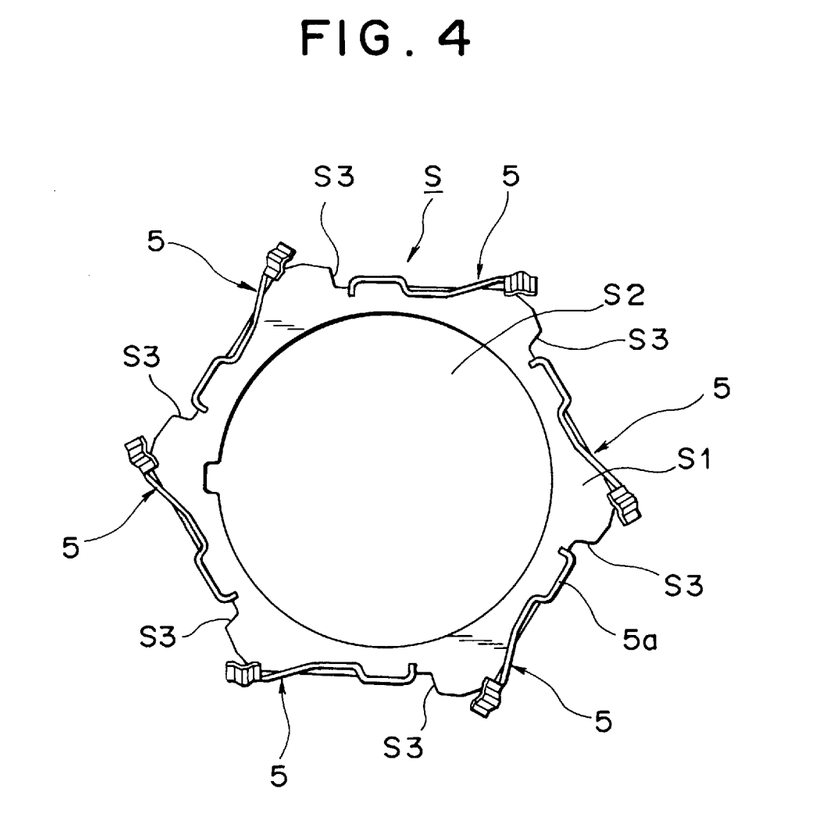
FIG. 4 is a plan view of the centering member in accordance with the present invention.
Figure 5:
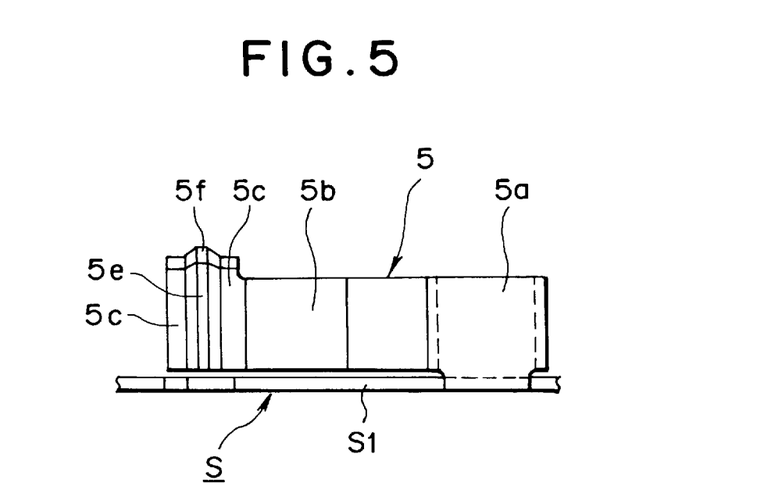
FIG. 5 is a partial enlarged view of the centering portion of the centering member in accordance with the present invention.

A centering member S is positioned at and affixed to a predetermined location on the upper surface of the rotor yoke 1 so as to be disposed at the inner portion of the cylindrical portion 4b of the turntable 4. The affixing is done using the adhesive used to affix the first attraction magnet 3. The centering member is a plate spring member made of phosphor bronze or the like. As shown in FIGS. 4 and 5, it has an annular shape, and has a circular hole S2 formed, for example, in a flat base S1 that is hexagonal in appearance in order to receive the first attraction magnet 3.

Positioning portions S3 are formed at each of the six sides of the hexagonal base S1. In addition, centering portions 5 are connected to these six sides. Each centering portion 5 has a supporting portion 5a formed by bending a portion of each centering portion 5 vertically from the base S1. The centering portions 5 extend from their corresponding supporting portions 5a in the direction of the surface of the flange 4a that is the disk mounting surface of the turntable 4. The centering portions 5 are resiliently biased horizontally and outwardly in the direction of the disk mounting surface of the turntable 4 (or in the direction of arrow B).

Each centering portion 5 is formed into the shape of a strip, and is disposed such that the lengthwise extension of each centering portion 5 is horizontal with respect to the direction of the disk mounting surface of the turntable, and the widthwise extension of each strip-like centering portion 5 is perpendicular to the direction of the disk mounting surface of the turntable 4. The centering portions 5 each have an arm 5b extending lengthwise from its associated supporting portion 5a, a tongue-piece like centering wall 5c provided at an end of its associated arm b, and a sloped wall 5d disposed at each centering wall 5c whose upper portion slopes inwardly. With its corresponding supporting portion 5a as fulcrum, each centering wall 5c is resiliently biased horizontally and outwardly in the direction of the surface of the flange 4a that is the disk mounting surface of the turntable 4 (or in the direction of arrow B).

The cylindrical portion 4b including an inner wall 4h of the turntable 4 is formed by pressing accurately into a cylindrical shape, with its center of rotation disposed on the upper surface of the rotor yoke 1 so as to coincide with the center of rotation of the rotary shaft 2. The supporting portions 5a of each of the centering portions 5a are lightly press-fitted to and contacted with the inner wall 4h of the turntable 4. Thus, the supporting portions 5 of each of the centering portions 5 are disposed on the same circumference at the same radius from the center of rotation of the turntable 4. That is, all six of the supporting portions 5a of the centering member 5 are disposed at equal intervals on the same circumference at the same radius, making it possible to equally resiliently press the centering portions 5 against a center hole D1 of the disk D, so that variations in the centering force of the six centering portions 5 can be minimized.

Each of the sloped walls 5d of the centering portions 5 are sloped inwardly with an angle which is greater than the sloping angle of the sloped wall 4c of the turntable 4. A first protruding strip portion 5e is formed at the center portion of each centering wall 5c. A second protruding strip portion 5f is formed at the center portion of each sloped wall 5d. Each second protruding strip portion 5f is formed continuously with its associated first protruding strip portion 5e. Since each second protruding strip portion 5f is positioned so as to be inwardly bent at a greater angle than the sloped wall 4d of the turntable 4, when the disk D is being loaded, the upper end of each second protruding strip portion 5f does not interfere with the peripheral edge of the center hole D1 of the disk D. The peripheral edge of the center hole D1 of the disk D is such as to contact at about the sloped intermediate portion of each second protruding strip portion 5f.

In the centering member S, each positioning portion S3 contacts one of the side walls 4f of the associated centering window 4d of the turntable 4. Each supporting portion 5a, formed by vertically bending a portion of its associated centering portion 5, contacts and is positioned at the inner wall of the cylindrical portion 4b of the turntable 4 at a predetermined location in order to be mounted onto the upper surface of the rotor yoke 1.

Figure 6:
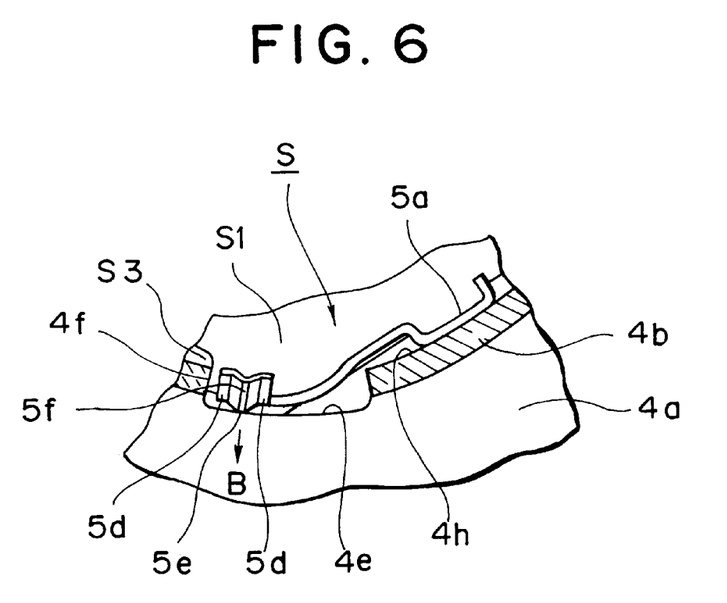
FIG. 6 is a sectional view of the main portion of the centering member and the turntable in accordance with the present invention to illustrate the relationship therebetween.
Figure 7:
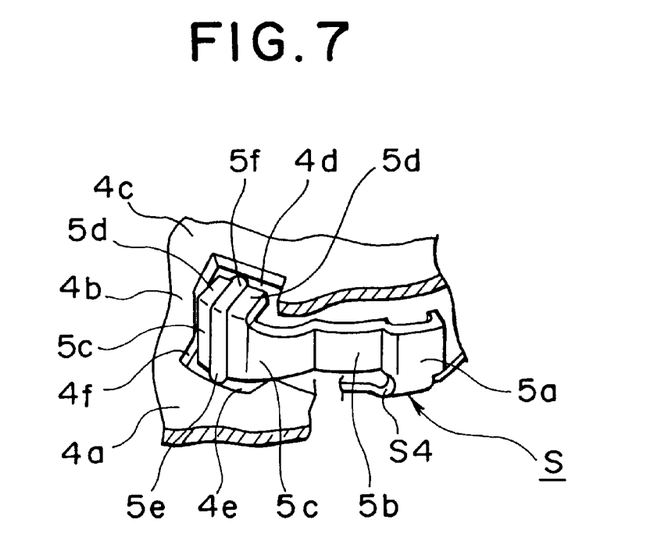
FIG. 7 is a sectional view of the main portion of the centering member and the turntable in accordance with the present invention to illustrate the relationship therebetween.

Here, in the plurality of centering portions 5, the lower ends of each of the first protruding strip portions 5e resiliently contacts the positioning walls 4e of the turntable 4, and is resiliently biased by an outward force with its associated supporting portion 5a as fulcrum, whereby the centering portions 5 are positioned in their corresponding centering windows 4d of the turntable 4. Each of the protruding ends of the plurality of first protruding strip portions 5e contacts its associated positioning wall 4e to thereby position the first protruding strip portions 5e on the same circumference, so that they protrude slightly outward beyond the outer peripheral surface of the cylindrical portion 4b of the turntable 4. Thus, when the disk D is being loaded onto the turntable 4, the plurality of second protruding strip portions 5f uniformly contact at about their intermediate portions the peripheral edge of the center hole D1 of the disk D roughly guided by the sloped wall 4c of the turntable 4, without any gap therebetween. Therefore, the load of the disk D is uniformly exerted onto the plurality of second protruding strip portions 5f, causing the peripheral edge of the center hole D1 of the disk D to slide along the second protruding strip portions 5f, and down in a horizontal state toward the flange 4a that provides the mounting surface of the turntable 4 as it inwardly pushes the first protruding strip portions 5e.

The plurality of first protruding strip portions 5e are resiliently biased with a force exerted outwardly and horizontally in the direction of the surface of the flange 4a that is the disk D mounting surface (or in the direction of arrow B), so that its center hole D1 is uniformly resiliently pressed, whereby centering of the disk D is performed.

Anti-slipping sheets 6 are bonded at equal intervals at a plurality of locations along the upper surface of the peripheral edge of the flange 4a that provides the disk mounting surface of the turntable 4 in order to prevent slipping of the disk D loaded onto the turntable 4.

A clamper 7 composed of an iron plate or the like is disposed upwardly of the turntable 4, and includes a disk-shaped flange 7a and a hat-shaped cylindrical portion 7b which covers the top portion of the flange 7a.

A second attraction magnet 8, composed of a sintered ferrite material, is affixed using an adhesive or the like to a surface of the ceiling 7d in the hat-shaped interior of the cylindrical portion 7b. The center portion of the ceiling 7d has a center hole 8a extending therethrough. An alignment shaft 9 which is coma-shaped in appearance is fitted into the center hole 8a, and includes an alignment portion 9a at an end thereof and a taper 9b at its base. The alignment portion 9a and the taper 9b protrude downwardly from a lower surface 9c of the second attraction magnet 8.

The alignment shaft 9 has a threaded portion 9d formed upwardly and oppositely of the alignment portion 9a and fitted into the center hole 7e at the center portion of the damper 7.

Thus, the second attraction magnet 8 is centered at and mounted to the clamper 7 by means of the alignment shaft 9. A hook 10 is screwed onto the threaded portion 9d protruding from the center hole 7e of the clamper 7, so that the clamper 7, the second attraction magnet 8, and the alignment shaft 9 are integrally formed.

Figure 2:
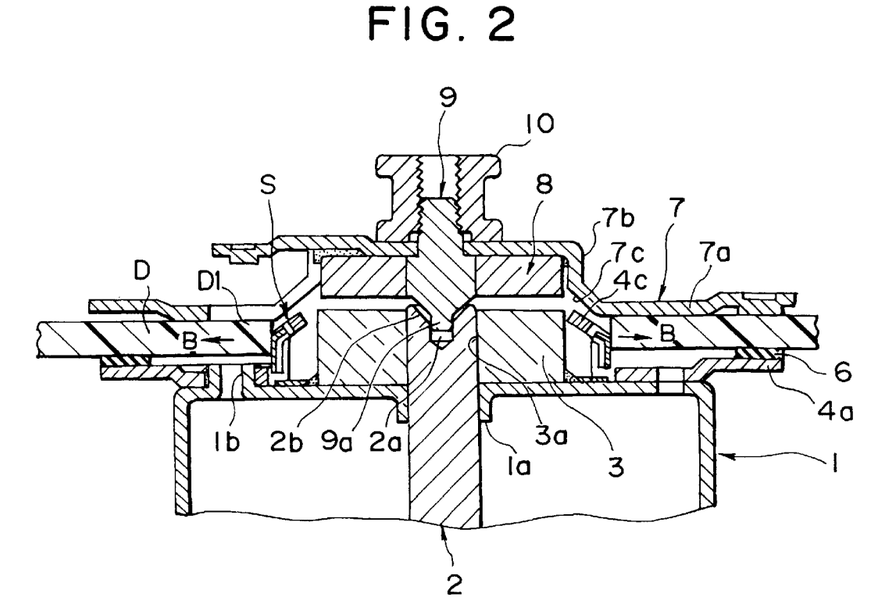
FIG. 2 is a sectional view of the disk driving device of FIG. 1, in which a disk is loaded.
Figure 8:
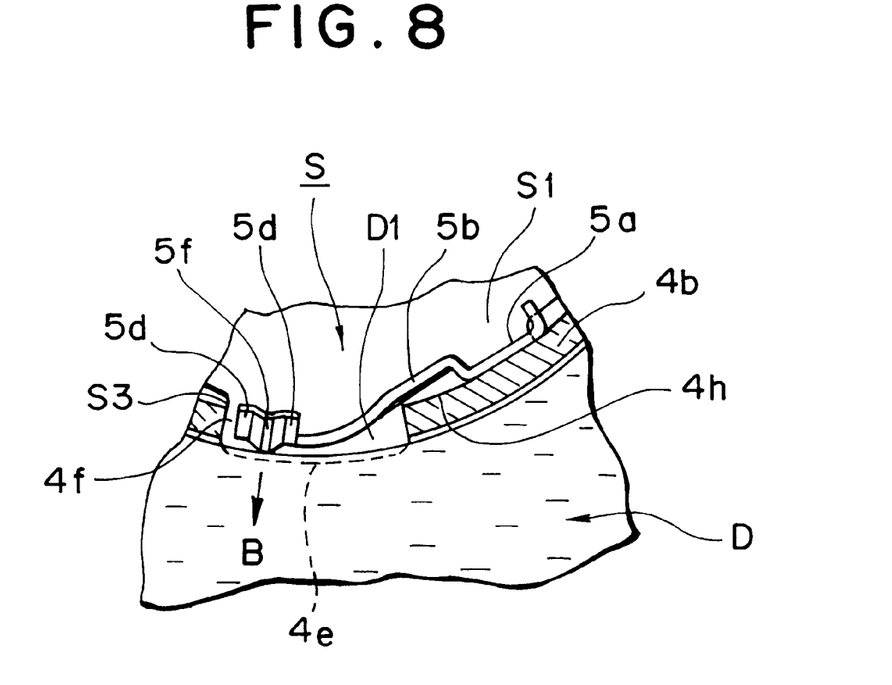
FIG. 8 is a sectional view of the main portion of the centering member and the turntable, when a disk is loaded into the disk driving device of the present invention.

A description will now be given of the operation of the disk driving device of the present invention. As shown in FIG. 2, when the disk D is loaded onto the turntable 4, the center hole D1 of the disk D is roughly guided by the sloped wall 4c of the turntable 4, causing the peripheral edge of the center hole D to contact at about the intermediate portions of the second protruding strip portions 5f of the centering portions 5 that are protruding slightly outwardly from the centering windows 4d of the cylindrical portion 4b. Thus, the second protruding strip portions 5f are pressed inward due to a rotational motion, with the supporting portions 5a as centers, as a result of the weight of the disk D. Then, when the second protruding strip portions 5f move slightly inwards, the disk D starts to slide downward, causing the peripheral edge of the center hole D1 of the disk D to contact the first protruding strip portions 5e. When it slides further downwards, the ends of the first protruding strip portions 5e contact the inner peripheral surface of the center hole D1 of the disk D in the direction of the plate thickness, so that the centering portions 5 are resiliently biased outwardly and horizontally in the direction of the surface of the flange 4a that is the disk mounting surface of the turntable 4. As a result, the disk D is centered and loaded onto the anti-slipping sheets 6 on the flanges 4a providing the disk mounting surface.

Figure 9:
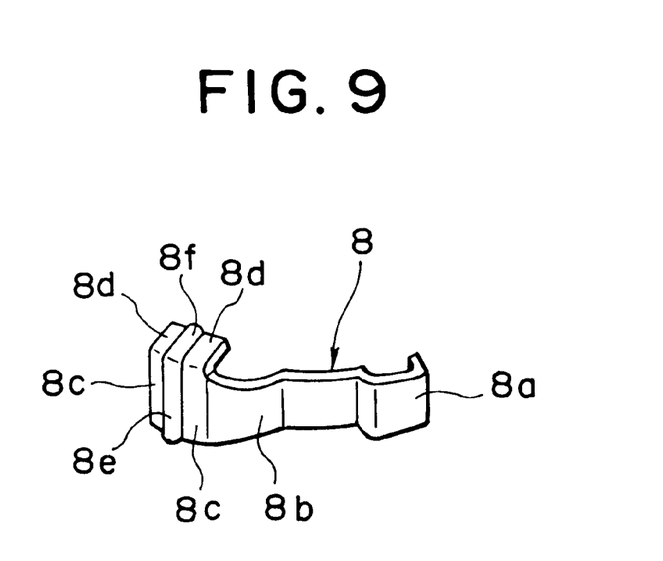
FIG. 9 is a view of a centering member in another embodiment of the present invention.

In synchronism with the mounting of the disk D to the turntable 4, the clamper 7 waiting above the turntable 4 of FIG. 9 starts to move downward.

Here, the attractive forces of the second attraction magnet 8 at the clamper 7 side and the first attraction magnet 3 at the turntable 4 side produce a force that tries to move the clamper 7 further downwards, causing the alignment portion 9a of the alignment shaft 9 mounted adjacent to the clamper 7 to be guided by the chamfered portion 2b formed at an end of the rotary shaft 2 and be fitted into the alignment hole 2a, as a result of which the clamper 7 is centered with respect to the turntable 4. Upon centering of the clamper 7, the flange 7a of the clamper 7 press-contacts and clamps the disk D along with the flange 4a of the turntable D to thereby complete the chucking of the disk D. The press-contacting force of the flange 7a of the clamper 7 used for chucking the disk D adjusts the magnetic force of the first and second attraction magnets 3 and 8 to a predetermined strength, thereby preventing the disk D from being scratched or deformed from the press-contacting by the flange 7a of the clamper 7.

Upon completion of the chucking of the disk D, electrical power with a predetermined phase is supplied to a driving coil of a spindle motor (not shown) to rotate the rotor yoke 1 and the rotary shaft 2, which causes rotation of the turntable 4. Thus, the disk D, while being chucked by the turntable 4 and the turntable, rotates integrally therewith, as a result of which information can be read out from or written onto the disk D.

Although in the foregoing description a plurality of centering portions 5 were integrally formed in the annular centering member S, in another embodiment the center portions 5 may be formed separately, so that they may be mounted to either the cylindrical portion 4b of the turntable 4 or the rotor yoke 1. For example, a centering member 8 as shown in FIG. 9 may be used. The centering member 8 is a strip-like plate spring member made of, for example, phosphor bronze. Using an adhesive or the like, it is mounted and disposed at a predetermined location at the inner portion of the cylindrical portion 4b of the turntable 4 such that the lengthwise extension of the centering member 8 is horizontal to the disk-mounting surface of the turntable, and the widthwise extension of each strip-like centering portion 5 is perpendicular to the direction of the disk mounting surface of the turntable 4.

The centering member 8 includes a centering portion 8b extending lengthwise from the supporting portion 8a, a tongue-piece like centering wall 8c formed at an end of the centering portion 8b, and a sloped wall 8d sloping inwardly and disposed at the top portion of the centering wall 8c. A first protruding strip portion 8e is formed at the center portion of the centering wall 8c, and a second protruding strip portion 8f is formed at the center portion of the sloped wall 8d continuously with the first protruding strip portion 8e.

With the supporting portion 8a mounted inwardly of the cylindrical portion 4b of the turntable 4, the centering wall 8c is mounted by being resiliently biased outwardly and horizontally in the direction of the surface of the flange 4a that is the disk mounting surface of the turntable 4 (direction of arrow B).

Subsequent operations are the same as those of the centering member S of the present invention.

Although not shown, in a modification of the latter embodiment, the lower portion of the supporting portion 8a of the centering member 8 may be extended to form an extended portion bent at right angles, forming a right-angled portion mounted to a surface of the rotor yoke 1.

As can be understood from the foregoing description, according to the disk driving device of the present invention, the centering member includes a supporting portion and a centering portion extending from the supporting portion in the direction of the disk-mounting surface of the turntable, so that the centering portion is resiliently biased outwardly and horizontally in the direction of the disk-mounting surface of the turntable to center the disk. Therefore, only an outward and horizontal force is exerted onto the center hole of the disk, which prevents the disk from tilting, or the disk from rising from the disk-mounting surface of the turntable. Thus, it is possible to provide a disk driving device with increased centering precision and which allows information to be accurately read out from or written onto the disk.

In addition, according to the disk driving device, since a centering member includes a supporting portion, and a centering portion extending in the direction of the disk-mounting surface of the turntable from the supporting portion, the distance of the centering portion from the supporting portion can be made somewhat large, without affecting the component parts around the centering member, thereby increasing the freedom with which the disk driving device can be designed. Further, since the distance of the centering portion from the supporting portion can be set somewhat large, the load exerted onto the supporting portion is small, even when a load is repeatedly exerted onto the supporting portion due to the loading and unloading of the disk. Thus, it is possible to provide a disk driving device having a long life and capable of withstanding loads that are repeatedly exerted.

Further, the centering member has a base having a plurality of centering portions integrally formed therewith, thereby facilitating handling of the centering member, and thus the assembly task.

Still further, since the centering portion has a protruding strip portion extending perpendicular to the disk-mounting surface of the turntable, when the disk is centered, the protruding strip portion is resiliently pressed against the inner peripheral surface of the center hole of the disk in a direction of the plate thickness, reducing the area of contact between the center hole and the centering portion. This reduces the frictional resistance between the center hole and the centering portion during loading of the disk onto the turntable, allowing the disk to be smoothly loaded onto the disk-loading surface of the turntable, thereby preventing the disk from tilting or the disk from rising from the disk-mounting surface.

Still further, since positioning portions are formed for positioning the plurality of centering portions on the same circumference on the turntable or the rotor yoke, when the disk D is being loaded onto the turntable 4, the plurality of second protruding portions uniformly contact at around their intermediate portions the peripheral edge of the center hole of the disk roughly guided at the sloped wall 4c of the turntable 4, so that a uniform disk load is exerted onto the plurality of second protruding strip portions. Thus, the peripheral edge of the center hole of the disk slides along the second protruding portions, so that the disk oriented horizontally slides down to the flange providing the disk-mounting surface of the turntable 4, while it presses the first protruding portion inward, thereby allowing the centering to be performed with high accuracy.

Still further, a cylindrical portion is provided for guiding the disk to the turntable. A plurality of centering windows are formed in the cylindrical portion, with the centering portions formed in the centering windows such that the protruding strip portions of the centering portions protrude beyond the outer peripheral surface of the cylindrical portion. Therefore, if an abnormality occurs in the disk driving device, and the disk is chucked by the damper 7, so that a large chucking force acts in the horizontal direction, the movement of the disk at the cylindrical portion is restricted, preventing the disk as well as the centering member from breaking. Thus, it is possible to provide a disk driving device with a high resistance to shock.

What is claimed is:

1. A disk driving device, comprising:

a rotor yoke;

a turntable mounted to said rotor yoke and including a disk-mounting surface; and a centering member operative to center a disk, said centering member including a flat base operative to mount said centering member with said rotor yoke, a plurality of supporting portions, and a centering portion extending from each of said supporting portions in a direction of the disk-mounting surface of said turntable, each of said centering portions integrally formed with said flat base by bending a peripheral edge of each of said centering portions to form said support portions, said centering member being resiliently biased horizontally and outwardly in the direction of the disk-mounting surface of said turntable in order to center the disk by said centering portions;

wherein each of said centering portions is formed by a strip-like, plate-shaped member, and wherein said each of said centering portions is disposed such that a lengthwise extension of said each of said centering portions is horizontal to the direction of the disk-mounting surface of said turntable, and a widthwise extension of said each of said plate-shaped members is perpendicular to the direction of the disk-mounting surface of said turntable.

2. A disk driving device according to claim 1, wherein said centering portion comprises a strip-like protruding portion extending in a direction perpendicular to the direction of the disk-mounting surface of said turntable.

3. A disk driving device according to claim 1, further comprising a positioning portion for positioning a plurality of said centering portions along a same circumference on either said turntable or said rotor yoke by bringing the plurality of said centering portions into contact with locations along the same circumference.

4. A disk driving device according to claim 2, further comprising a cylindrical portion for guiding a disk to said turntable, said cylindrical portion having formed therein centering windows at a plurality of locations, said centering windows having positioned therein said centering portions such that said protruding portions of said centering portions protrude beyond the outer peripheral surface of said cylindrical portion.

* * * * *